United States Patent [19]
Jolly

[11] Patent Number: 5,779,779
[45] Date of Patent: Jul. 14, 1998

[54] UV-BLOCKING HOT MELT INKS

[75] Inventor: Augusta Jolly, Canoga Park, Calif.

[73] Assignee: Dataproducts Corporation, Simi Valley, Calif.

[21] Appl. No.: 724,166

[22] Filed: Sep. 27, 1996

[51] Int. Cl.$^6$ .................................................. C09D 11/00
[52] U.S. Cl. .................... 106/31.29; 106/31.31; 106/31.35
[58] Field of Search ............... 106/31.29, 31.31, 106/31.35

[56] References Cited

U.S. PATENT DOCUMENTS

| | | |
|---|---|---|
| 4,256,493 | 3/1981 | Yokoyama et al. ............... 106/31.58 |
| 4,390,369 | 6/1983 | Merritt et al. |
| 4,484,948 | 11/1984 | Merritt et al. ............... 106/31.31 |
| 4,851,045 | 7/1989 | Taniguchi ............... 106/31.31 |
| 4,878,946 | 11/1989 | Tabayashi et al. ............... 106/31 |
| 4,931,095 | 6/1990 | Nowak et al. ............... 106/31.29 |

FOREIGN PATENT DOCUMENTS

| | | |
|---|---|---|
| 55139216 | 10/1980 | Japan . |
| 04074692 | 3/1992 | Japan . |

OTHER PUBLICATIONS

Patent Coorperation Treaty, International Search Report, Sep. 26, 1997.

*Primary Examiner*—Deborah Jones
*Attorney, Agent, or Firm*—Pillsbury Madison & Sutro LLP

[57] ABSTRACT

UV-blocking hot melt ink jet inks for printing on flexible and other media. An UV-blocking hot melt ink jet ink for flexo-graphic plating comprises a wax, a plasticizer, an UV blocker, and a dye. Such an ink is flexible and durable, gives good printing quality, and is also removable from the flexo plate substrates during the wash out cycle of the flexo-plating process. Another UV-blocking hot melt ink jet ink for printing on silk screens comprises a wax, a fatty acid, an UV blocker and a dye. Such an ink is readily removable from the silk screen without harming the screen.

18 Claims, No Drawings

UV-BLOCKING HOT MELT INKS

FIELD OF THE INVENTION

The present invention relates to hot melt inks and, in particular embodiments, to ultraviolet-blocking hot melt ink jet inks for printing on flexible and other substrates.

BACKGROUND OF THE INVENTION

"Hot melt" inks are inks which are typically in a solid form at room temperature, but which change to a liquid at an elevated temperature above the room temperature. In general, hot melt inks and ink jet apparatus employing the same are well known, and are described in, for example, U.S. Pat. No. 4,484,948 to Merritt et al. (natural wax-containing ink), U.S. Pat. No. 4,931,095 to Nowak et al. (benzoate ink), and U.S. Pat. No. 4,459,601 to Howkins. The hot melt ink technology can be used to print images on many different media.

One type of such media is flexible substrates for flexo-graphic plating (flexo-plating). Flexo-graphic plating is a technique for creating images directly on a flexible (elastomer) medium, such as a flexo-plate, or a metal printing plate. Conventionally, flexo-graphic printing involves a photographic method utilizing a conventional imaged negative.

It is an object of a preferred embodiment of the present invention to provide UV-blocking hot melt inks for flexo-graphic plating. Another object of a preferred embodiment of the present invention is to provide such inks that have good adhesion to various flexo-graphic printing media. Yet another object of a preferred embodiment of the present invention is to provide such inks that are flexible, durable and have good crack resistance.

It is an object of another preferred embodiment of the invention to provide UV-blocking hot melt inks for printing on silk screens. It is another object to provide such inks that are removable from the silk screen without harming the screen.

SUMMARY OF THE DISCLOSURE

According to an embodiment of the present invention, an UV-blocking hot melt ink for use in flexo-graphic plating is provided, which comprises a wax, a plasticizer, an UV blocker, and a dye.

According to another embodiment of the present invention, an UV-blocking hot melt ink for printing on a silk screen is provided, which comprises a wax, an UV blocker, a fatty acid, and a dye.

For example, in one preferred embodiment, the UV blocking ink composition comprises about 30 to 95 % by weight (wt. %) of a wax, such as Montan wax or ester based wax; up to about 30 wt. % of a plasticizer, such as glyceryl tribenzoate; and about 1 to 20 wt. % of a suitable UV blocker. In further embodiments, a dye is included in the composition such that the ink is readily visible when applied to a substrate. In yet further embodiments, the amount of wax in the composition is about 25 to 85 wt. % and the composition also includes about 10 to 70 wt. % of a fatty acid, such as myristic acid.

DETAILED DESCRIPTION OF THE PREFERRED EMBODIMENT

Conventional flexo-graphic plating involves a photographic method utilizing a conventional imaged negative. The UV-blocking hot melt ink according to an embodiment of the present invention may be used in a flexo-graphic plating method involving a photopolymer.

In such a flexo-plating process, the flexible substrate is coated with a photopolymer which is sensitive to ultraviolet (UV) light. When exposed to UV light, the photopolymer layer is cured to create a hardened surface. By printing on the photopolymer layer a special ink which blocks the UV light, the photopolymer layer is selectively prevented from curing, thus creating a desired negative image on the flexo-plate.

The special ink used in flexo-graphic plating applications preferably has good adhesion to various flexo-graphic printing media (substrate), good UV-blocking capability, and is removable from the surface of the substrate during the wash out cycle of the plating process. In addition, the ink preferably has good crack resistance, and is flexible and durable for the elastomeric material used in the flexo-plating process.

Printing techniques using an UV-sensitive photopolymer and an UV-blocking hot melt ink may also be used for printing graphics on silk screens. When used on a silk screen, the ink is preferably removable from the silk screen during a wash cycle without harming the screen itself.

The hot melt UV-blocking inks according to embodiments of the present invention may be used for printing with any suitable apparatus, but is preferably used in ink jet apparatus. When used in ink jet apparatus, the inks preferably have qualities that are generally required for ink jet inks, such as good printing quality, small dot size, and good jetability.

Solid hot-melt inks according to embodiments of the present invention may be formed by melting a wax, adding other necessary ingredients, and re-solidifying the mixture by cooling.

One embodiment of the present invention is an UV-blocking hot melt ink for flexo-graphic plating comprising a wax, a plasticizer, an UV blocker, and a dye. The wax is preferably a Montan wax, but may also be other natural or synthetic waxes (synthetic wax is generally preferred), such as paraffin wax, candelilla wax, etc., or mixtures thereof. The wax content of the ink composition may vary between 30 to 95 percent by weight (wt. %), depending on the amount of plasticizer and UV blocker needed.

The plasticizer may be an inert ester type plasticizer, preferably glyceryl tribenzoate (Benzoflex S404), or other types of plasticizers. The desired amount of plasticizer in the ink composition depends upon the flexibility of the plate medium (the printing substrate), and is preferably up to 30 wt. %. In further embodiments, such as for application on a substantially rigid printing substrate, very little or no plasticizer may be used.

Varying the amount of plasticizer can vary the viscosity of the ink. It is preferable to control the viscosity of the ink so that it falls within an acceptable range at the nominal operating temperature of the print head, such as 8 to 12 centipoise at jetting temperature (60° to 300° C.). This may be accomplished by varying the type of wax used, and/or by adding a fatty acid. For example, when less Benzoflex (plasticizer) is used, the viscosity of the ink typically increases, and a low viscosity wax may be added to adjust the viscosity of the resultant ink.

The UV blocker selected for use in the ink depends on the wavelength of the UV light used to cure the photopolymer in the flexo-graphic plating process. To block UV light with wavelengths in the range of 330 to 400 nm, dihydroxy-4-methoxybenzophenone (Cyasorb UV24) may be used. For flexo-plating systems operating under UV lights in other wavelength ranges, other UV blockers may be suitably employed, such as 2-(2-hydroxy-5-octylphenyl)-benzotriazole C-122 (Cyasorb UV5411) (for wavelength range from 300 nm to 360 nm), or 2-hydroxy-4-n-octoxybenzophenone (Cyasorb 531) (for wavelength range from 250 nm to 360 nm). Other UV-absorbing agents may also be used as the UV blocker, so long as they have acceptable solubility in the ink vehicle. The amount of UV blocker used depends on the UV exposure time employed in the flexo-plating process, and is preferably sufficient to cause near 100% UV blockage under typical exposure times. For example, between 5 to 20 wt. % of Cyasorb UV24 may be used for a typical UV exposure time, such as 10 minutes.

A dye may be included in the ink to enhance the visibility of the printed ink on the substrate. However, in further embodiments, the dye may be omitted from the UV-blocking ink formulation without affecting other functions of the ink. When a dye is desired, it is preferable to use a dye which results in good color contrast for the particular substrate on which the ink is to be printed. For example, a magenta dye may be used for a green substrate, and a dark blue dye may be used for a yellow substrate. Any suitable dye may be employed, so long as it is soluble in the ink vehicle. Preferably, the amount of dye used is sufficient to cause the printed ink to be readily visible on the substrate.

The following is an example of a preferred formulation of an UV-blocking hot melt ink jet ink.

EXAMPLE 1

A Montan wax (Hoechst KPS wax) was heated to a liquid state. Glyceryl tribenzoate (manufactured by Velsicol and sold under the trade name Benzoflex S404), dihydroxy-4-methoxybenzophenone (manufactured by Cytec and sold under the trade name Cyasorb UV24), and Sudan Blue dye 35 (manufactured by BASF) were added to the wax. The resulting mixture had 59 wt. % Montan wax, 30 wt. % Benzoflex S404, 10 wt. % Cyasorb UV24, and 1 wt. % Sudan Blue 35. The mixture was subsequently cooled to room temperature and formed a solid.

This formulation was printed on a substrate, exposed to 350 nm UV light of 130 mW/cm² intensity for 20 minutes, and showed a virtually 100% UV blockage. Exposure to 50 mW/cm² of UV light for up to 45 min also showed desired blockage effects. It was also successfully tested in an actual flexo-graphic plating process. The viscosity of the ink at 130° C. was 11.2.

Tables 1 through 4 show 25 additional preferred embodiments of UV-blocking hot melt ink jet ink formulations for flexo-graphic plating applications.

TABLE 1

| Ingredients | | | | | | | |
|---|---|---|---|---|---|---|---|
| KPS wax | 60 | 59 | 60 | 60 | 59 | 58 | 58 |
| Behenic acid | 38 | 38 | 38 | 38 | 37 | 37 | 36 |
| SY-162 | 1 | — | — | — | — | — | — |
| UV-24 | 1 | 2 | — | — | 3 | 4 | 5 |
| UV-531 | — | — | 1 | — | — | — | — |
| UV-5411 | — | — | — | 1 | — | — | — |
| Red 78747 | — | 1 | — | — | — | — | — |
| Tricon 19388 | — | — | 1 | — | — | — | — |
| SB-35 | — | — | — | 1 | — | — | — |
| losol red | — | — | — | — | — | 1 | — |
| s.red-violet | — | — | — | — | — | — | 1 |
| Sudan orange | — | — | — | — | 1 | — | — |

TABLE 2

| Ingredients | | | | | | |
|---|---|---|---|---|---|---|
| E-wax | — | — | — | — | — | 39 |
| Crodamide 211 | 46 | — | — | 48 | 50 | — |
| E-5 | 9 | 10 | 14 | 14 | 20 | 20 |
| Behenic acid | 41 | 43 | 17 | 17 | — | — |
| Dye | 1 | 1 | 1 | 1 | 1 | 1 |
| 1230 wax | — | 46 | — | — | — | — |
| 1240 wax | — | — | 48 | — | — | — |
| Benzoflex | — | — | 20 | 20 | 29 | 40 |
| UV-24 | 3 | — | not | — | — | — |

TABLE 3

| Ingredients | | | | | | |
|---|---|---|---|---|---|---|
| Crodamide 211 | — | 45 | 44 | 50 | — | — |
| E-5 | 18 | 9 | 9 | 9 | — | — |
| Behenic acid | 10 | 40 | 39 | 30 | 20 | 31 |
| Benzoflex S404 | 34 | — | — | — | — | — |
| UV-24 | 3 | 5 | 7 | 10 | 10 | 10 |
| Dye | 1 | 1 | 1 | 1 | 1 | 1 |
| KPS | 34 | — | — | — | 59 | 46 |
| DM-55 | — | — | — | — | 10 | 12 |

TABLE 4

| Ingredients / physical data | | | | | |
|---|---|---|---|---|---|
| KPS wax | 59 | 74 | 69 | 74 | 69 |
| Behenic acid | 15 | — | — | — | — |
| Benzoflex S404 | 5 | 10 | 15 | 15 | 20 |
| DM-55 | 10 | 5 | 5 | — | — |
| UV-24 | 10 | 10 | 10 | 10 | 10 |
| Dye | 1 | 1 | 1 | 1 | 1 |
| Viscosity at 130° C. (centipoise) | | 14.5 | 13.5 | 12.5 | 12.2 |

The unit of the numbers in the above Tables is percent by weight unless otherwise indicated.

In the above Tables, SY-162, Red 78747, Tricon 19388, SB-35, losol red, s.red-violet, and Sudan orange are dyes; UV-24, UV-531 and UV-5411 are UV blockers; E-wax is an ester based wax (Hoechst); crodamide 211 is an amide wax; E-5 is a resin thickening agent; 1230 wax and 1240 wax are paraffin waxes; and DM-55 is an acrylic resin. The dye used in Tables 2 and 4 may be any suitable dye, such as Sudan blue 35.

The embodiments described in Tables 1 to 4 show that a variety of waxes, wax mixtures, or mixtures of waxes, fatty acids and/or resins may be used in the hot melt ink compositions.

According to another embodiment of the present invention, an UV-blocking hot melt ink jet ink is provided for printing on silk screens. One desirable property of such an ink is its ability to be readily washed off of the silk screen by warm water. Alternatively, further ink embodiments may require washing out using hot water or a solvent.

A preferred embodiment of the composition for an UV-blocking hot melt ink jet ink for printing on silk screens comprises a wax, a fatty acid, an UV blocker and a dye. The types and amounts of UV blocker and dye may be determined using the same principles described for the above embodiment of the UV-blocking ink for flexo-graphic plating.

The wax used in the ink for printing on a silk screen is preferably an ester based wax. The fatty acid is preferably myristic acid, although other fatty acids may also be used, such as lauric acid or behenic acid. The fatty acid used preferably provides good solubility for the dye used (if any), and has relatively low viscosity. The amounts of the wax and the fatty acid are preferably such that the resulting solid ink has an acceptably low melting temperature, such as around 40° C., so that it may be washed off of the silk screen with warm water. For example, the use of myristic acid in the 10 to 70 wt. % range may result in a suitable ink for some applications, while the same in the 20 to 50 wt. % range is preferred.

A preferred UV-blocking hot melt ink composition for printing on silk screens comprises 40 wt. % of Crodamol behenyl erucate, 50 wt. % of myristic acid, 9 wt. % of Cyasorb UV-24 and 1 wt. % of Sudan blue dye. The melting range of this composition is 35°–50.2° C. Its peak melting point and fuse point are 46.0° C. and 44.1 ° C., respectively. This composition was shown to wash off easily from the silk screen. It was also proven to be very effective on aluminum substrates.

Tables 5 and 6 are additional preferred embodiments of UV-blocking hot melt ink compositions for printing on silk screens.

TABLE 5

| Ingredients / physical data | | | | | | |
|---|---|---|---|---|---|---|
| Myristic acid | 60 | 70 | — | — | — | — |
| Lauric acid | — | — | 70 | — | — | — |
| Jelly #20 | — | — | — | 45 | 45 | 30 |
| Oleamide | 15 | — | — | — | — | — |
| 1230 wax | — | — | — | 45 | — | — |
| Shell #400 wax | 15 | 20 | 20 | — | 45 | 60 |
| Cyasorb UV-24 | 9 | 9 | 9 | 9 | 9 | 9 |
| Sudan blue 670 | 1 | 1 | 1 | 1 | 1 | 1 |
| melting range (°C.) | 36–59 | 39–58 | 36–43 | 34–47.6 | 33–78 | 34–79 |
| peak melting point (°C.) | 40.7 | 50.5 | 39.0 | 44.1 | 40.4 | 43.0 |
| fuse point (°C.) | 45.3 | 49.3 | 58.3 | 36.2 | 62 & 43 | 64 |
| viscosity at 75 °C. (centipoise) | 10.0 | 8.8 | | | | |

TABLE 6

| Ingredients / physical data | | | | | | |
|---|---|---|---|---|---|---|
| Myristic acid | 60 | 30 | 50 | 70 | 50 | 39 |
| Shell #400 wax | 30 | — | 40 | — | — | — |
| Jelly #20 | — | — | — | 20 | — | — |
| Crodamol myristil myristate | — | — | — | — | 40 | 31 |
| synthetic bee's wax | — | 50 | — | — | — | — |
| E-90 resin | — | — | — | — | — | 20 |
| Cyasorb UV-24 | 9 | 9 | 9 | 9 | 9 | 9 |
| Sudan blue 670 | 1 | 1 | 1 | 1 | 1 | 1 |
| melting range (°C.) | 37–50 | 37–59 | 37–51 | 42–52.8 | | |
| peak melting point (°C.) | 47.4 | 41.8 | 45.6 | 48.9 | | |
| fuse point (°C.) | 62.4 | 47.0 | 62.3 | 42.9 | | |
| viscosity at 75 °C. (centipoise) | 9.3 | 12.7 | 16.9 | | | 12.5 |

In the above Tables, E-90 is a hydrogenated aromatic hydrocarbon; Jelly #20 is a petrolatum made by Penreco; and Shell #400 is a paraffin wax with a low melting point. The unit of the numbers is percent by weight unless otherwise indicated.

I claim:

1. An UV-blocking hot melt ink composition for printing on a substrate comprising:
   (a) about 30 to 95 wt. % of a wax;
   (b) up to about 30 wt. % of a plasticizer;
   (c) about 1 to 20 wt. % of an UV blocker; and
   (d) up to an amount of a dye sufficient to provide visibility of the ink when applied on the substrate.

2. The ink composition of claim 1 wherein the wax is a Montan wax.

3. The ink composition of claim 1 wherein the plasticizer is glyceryl tribenzoate.

4. The ink composition of claim 1 wherein the UV blocker is dihydroxy-4-methoxybenzophenone.

5. The ink composition of claim 1 wherein the UV blocker is 2-(2-hydroxy-5-octylphenyl)-benzotriazole C-122.

6. The ink composition of claim 1 wherein the UV blocker is 2-hydroxy-4-n-octoxybenzophenone.

7. The ink composition of claim 1 wherein the dye is Sudan Blue dye 35.

8. The ink composition of claim 1 wherein the wax is present in an amount of about 59 wt. %.

9. The ink composition of claim 1 wherein the plasticizer is present in an amount of about 30 wt. %.

10. The ink composition of claim 1 wherein the UV blocker is present in an amount of about 10 wt. %.

11. The ink composition of claim 1 wherein the dye is present in an amount of about 1 wt. %.

12. An UV-blocking hot melt ink composition for printing on a substrate comprising:
   (a) about 59 wt. % of a Montan wax;
   (b) about 30 wt. % of glyceryl tribenzoate;
   (c) about 10 wt. % of dihydroxy-4-methoxybenzophenone; and
   (d) up to an amount of a dye sufficient to provide visibility of the ink when applied on the substrate.

13. An UV-blocking hot melt ink composition for printing on a silk screen, comprising:
   (a) about 25 to 85 wt. % of a wax;
   (b) about 10 to 70 wt. % of a fatty acid;
   (c) about 5 to 20 wt. % of an UV blocker; and
   (d) up to an amount of a dye sufficient to provide visibility of the ink when applied on the silk screen.

14. The ink composition of claim 13 wherein the wax is an ester based wax.

15. The ink composition of claim 13 wherein the fatty acid is myristic acid.

16. The ink composition of claim 13 wherein the fatty acid is present in an approximate amount from 20 to 50 wt. %.

17. The ink composition of claim 15 wherein the amount of myristic acid is sufficient to cause the melting temperature of the ink to be acceptably low.

18. An UV-blocking hot melt ink composition for printing on a silk screen, comprising:
   (a) about 50 wt. % of myristic acid;
   (b) about 40 wt. % of behenyl erucate;
   (c) about 9 wt. % of dihydroxy-4-methoxybenzophenone; and
   (d) up to an amount of a dye sufficient to provide visibility of the ink when applied on the silk screen.

* * * * *